(12) United States Patent
Scibilio

(10) Patent No.: US 10,328,568 B1
(45) Date of Patent: Jun. 25, 2019

(54) TELESCOPING BACK TOOL KIT

(71) Applicant: Stephen Scibilio, Westerly, RI (US)

(72) Inventor: Stephen Scibilio, Westerly, RI (US)

( * ) Notice: Subject to any disclaimer, the term of this patent is extended or adjusted under 35 U.S.C. 154(b) by 0 days.

(21) Appl. No.: 16/161,171

(22) Filed: Oct. 16, 2018

(51) Int. Cl.
| | |
|---|---|
| A47K 7/04 | (2006.01) |
| B25G 1/04 | (2006.01) |
| A47L 13/08 | (2006.01) |
| A47L 13/46 | (2006.01) |
| B25G 3/02 | (2006.01) |
| B25J 1/00 | (2006.01) |
| A47L 13/16 | (2006.01) |

(52) U.S. Cl.
CPC .............. B25G 1/04 (2013.01); A47K 7/04 (2013.01); A47L 13/08 (2013.01); A47L 13/16 (2013.01); A47L 13/46 (2013.01); B25G 3/02 (2013.01); B25J 1/00 (2013.01)

(58) Field of Classification Search
CPC .......... A61H 7/003; A61H 7/005; B25G 1/04; B25G 3/02; A47L 13/08; A47L 13/46; A47L 13/16; A47K 7/04; B25J 1/00
See application file for complete search history.

(56) References Cited

U.S. PATENT DOCUMENTS

| | | | | |
|---|---|---|---|---|
| 5,904,661 A | * | 5/1999 | Bonz | A61H 7/005 601/101 |
| 6,182,539 B1 | * | 2/2001 | Webster | B25B 23/0021 81/177.2 |
| 6,415,470 B1 | | 7/2002 | Ramrattan | |
| 6,830,552 B1 | * | 12/2004 | Gonzalez | A61H 7/003 601/137 |
| 7,037,016 B1 | | 5/2006 | Nelson | |
| 7,503,923 B2 | * | 3/2009 | Miller | A61H 1/008 173/114 |
| 8,015,653 B2 | * | 9/2011 | Bargiel | A45D 34/04 15/104.94 |
| 8,856,966 B2 | * | 10/2014 | Doty | A61H 7/003 119/600 |
| D777,977 S | | 1/2017 | Lowe | |
| 2013/0234458 A1 | | 9/2013 | Wilkins | |

FOREIGN PATENT DOCUMENTS

CA      2353204      1/2003

* cited by examiner

Primary Examiner — Stephen A Vu
(74) Attorney, Agent, or Firm — Kyle A. Fletcher, Esq.

(57) ABSTRACT

The telescoping back tool kit is a multipurpose tool. The telescoping back tool kit comprises a base apparatus, a plurality of heads, and a threaded connection. The threaded connection removably attaches a head selected from the plurality of heads to the base apparatus. The head forms the working element of the telescoping back tool kit. The purpose of the telescoping back tool kit is changed by interchanging two heads selected from the plurality of heads. The base apparatus is a mechanical structure used to adjust the span of the distance between a user of the telescoping back tool kit and head selected from the plurality of heads.

17 Claims, 6 Drawing Sheets

US 10,328,568 B1

TELESCOPING BACK TOOL KIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including sanitary equipment not otherwise provided for, more specifically, a hand-operated mechanical cleaning implement. (A47K7/04)

SUMMARY OF INVENTION

The telescoping back tool kit is a multipurpose tool. The telescoping back tool kit comprises a base apparatus, a plurality of heads, and a threaded connection. The threaded connection removably attaches a head selected from the plurality of heads to the base apparatus. The head forms the working element of the telescoping back tool kit. The purpose of the telescoping back tool kit is changed by interchanging two heads selected from the plurality of heads. The base apparatus is a mechanical structure used to adjust the span of the distance between a user of the telescoping back tool kit and head selected from the plurality of heads.

These together with additional objects, features and advantages of the telescoping back tool kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the telescoping back tool kit in detail, it is to be understood that the telescoping back tool kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the telescoping back tool kit.

It is therefore important that the claims be regarded as including such equivalent construction insofar as they do not depart from the spirit and scope of the telescoping back tool kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
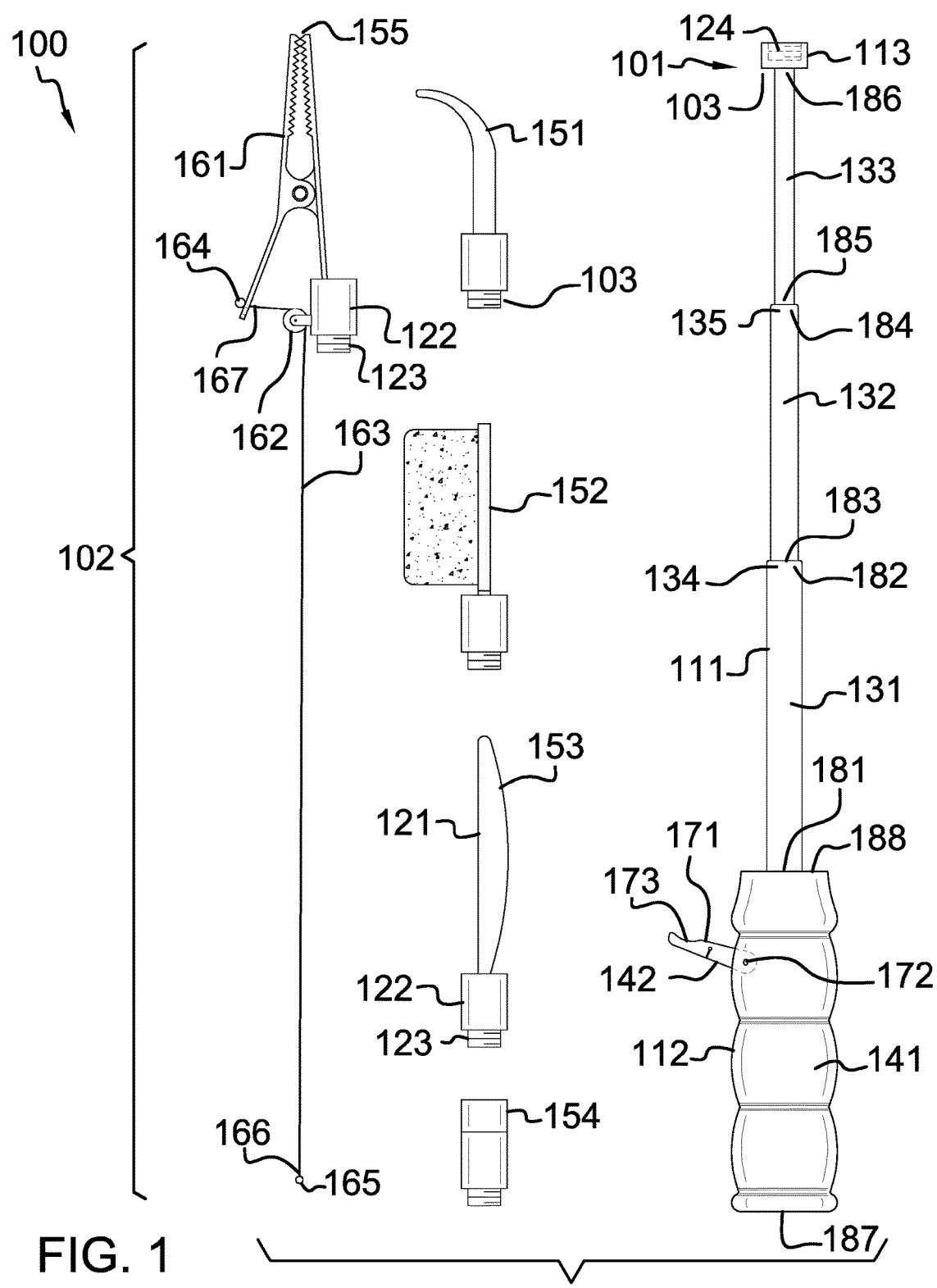
FIG. 1 is a front view of an embodiment of the disclosure.
Figure 2:
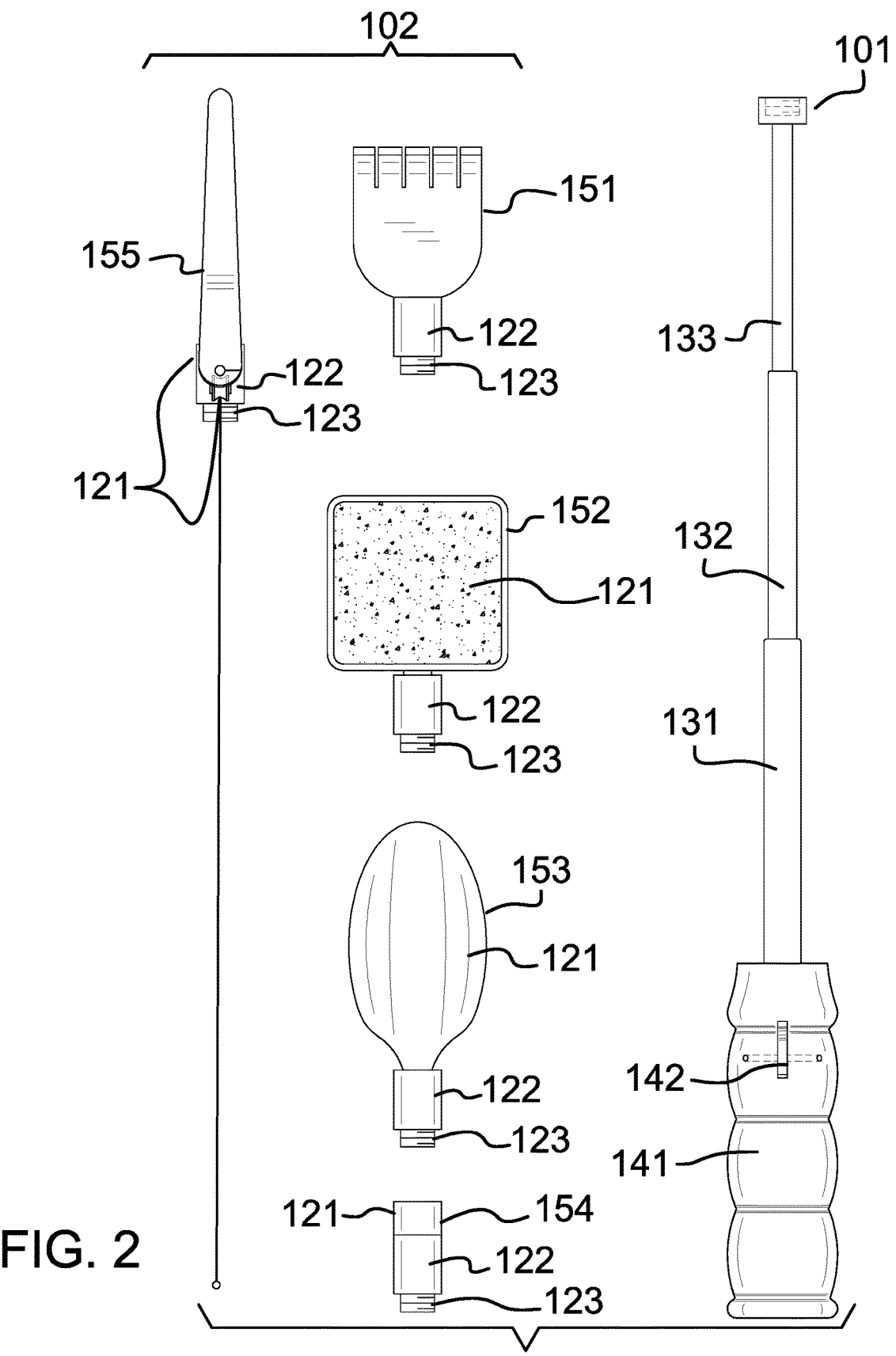
FIG. 2 is a side view of an embodiment of the disclosure.
Figure 3:
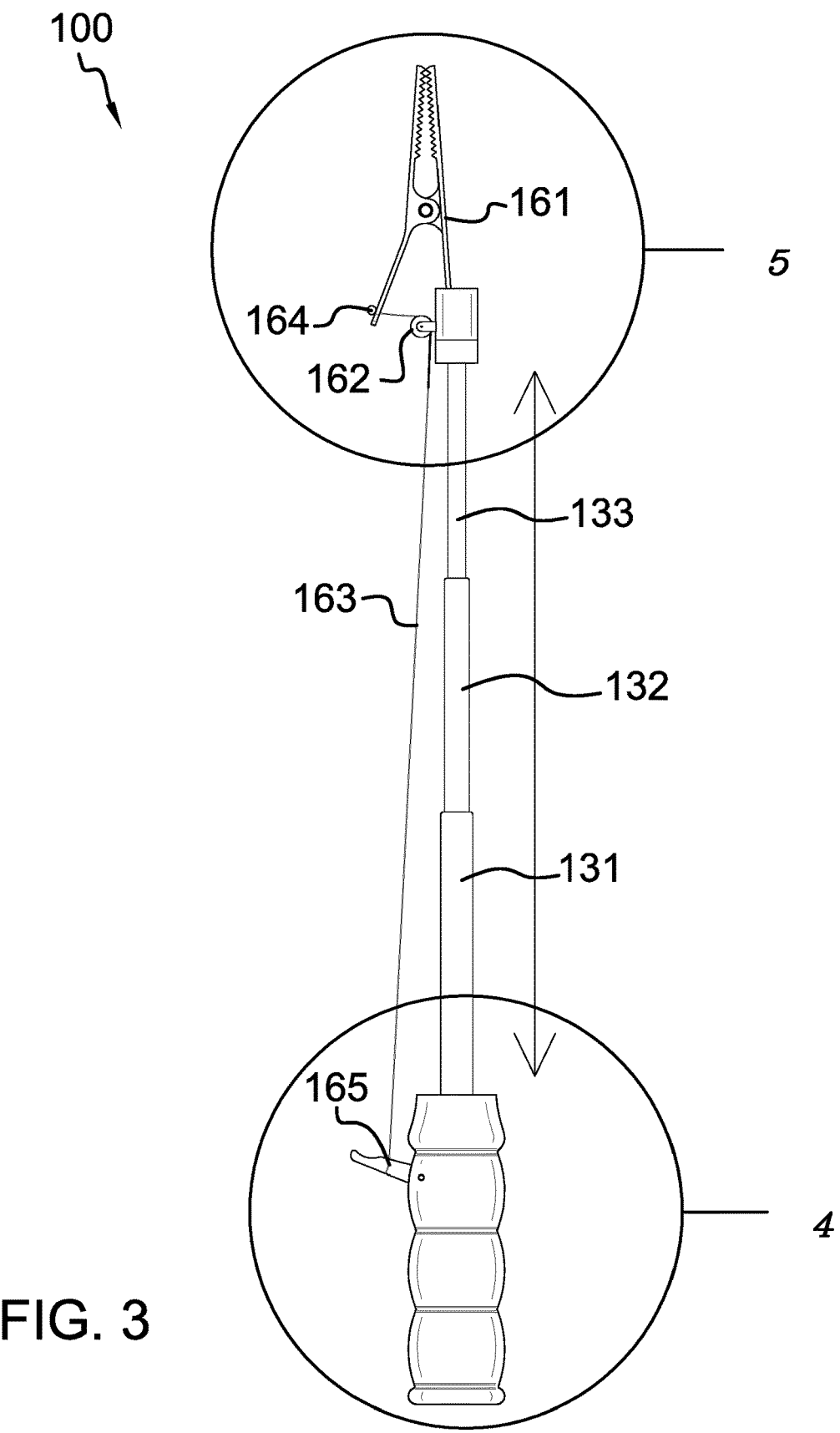
FIG. 3 is an in-use view of an embodiment of the disclosure.
Figure 4:
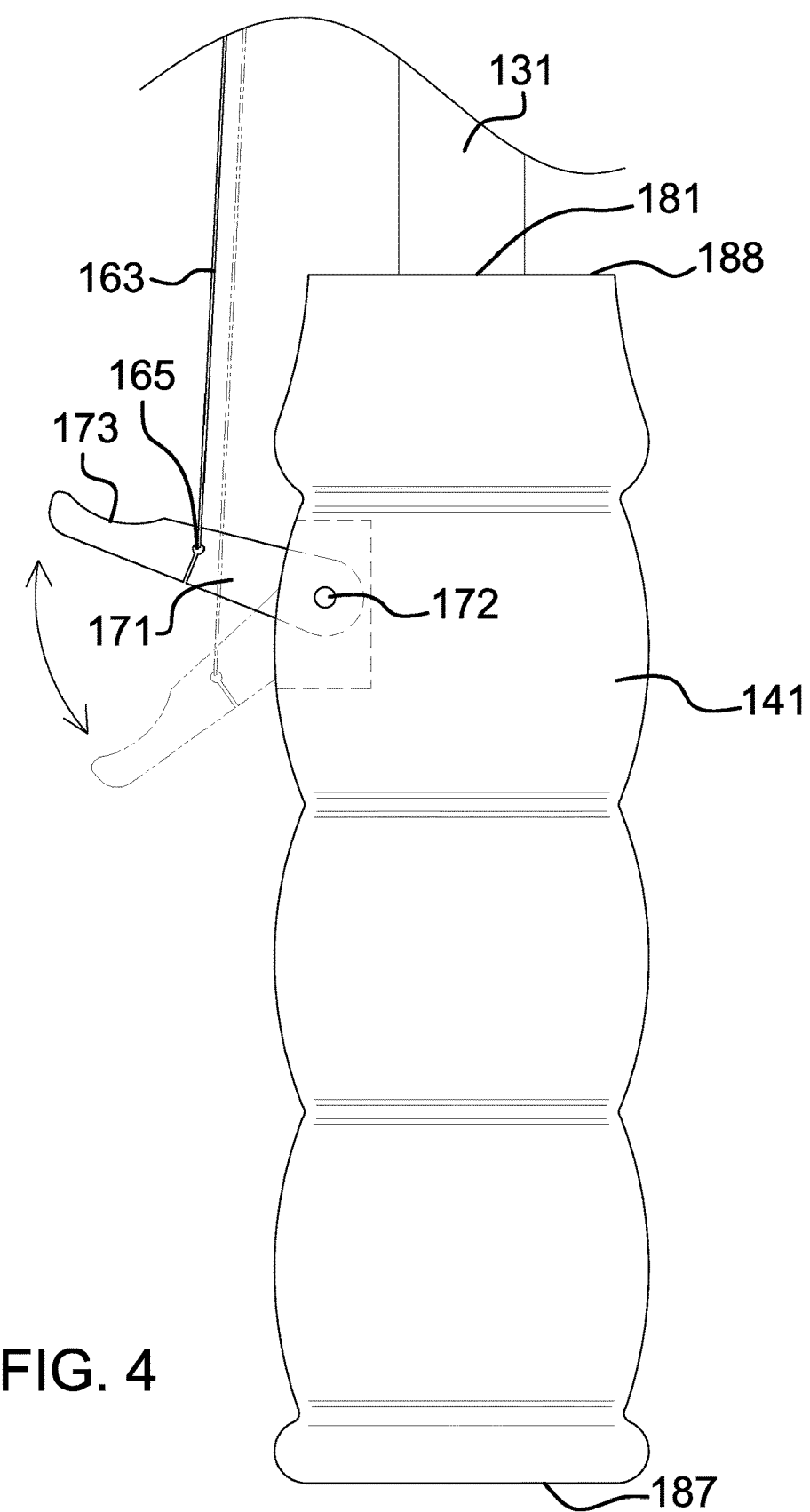
FIG. 4 is a detail view of an embodiment of the disclosure.
Figure 5:
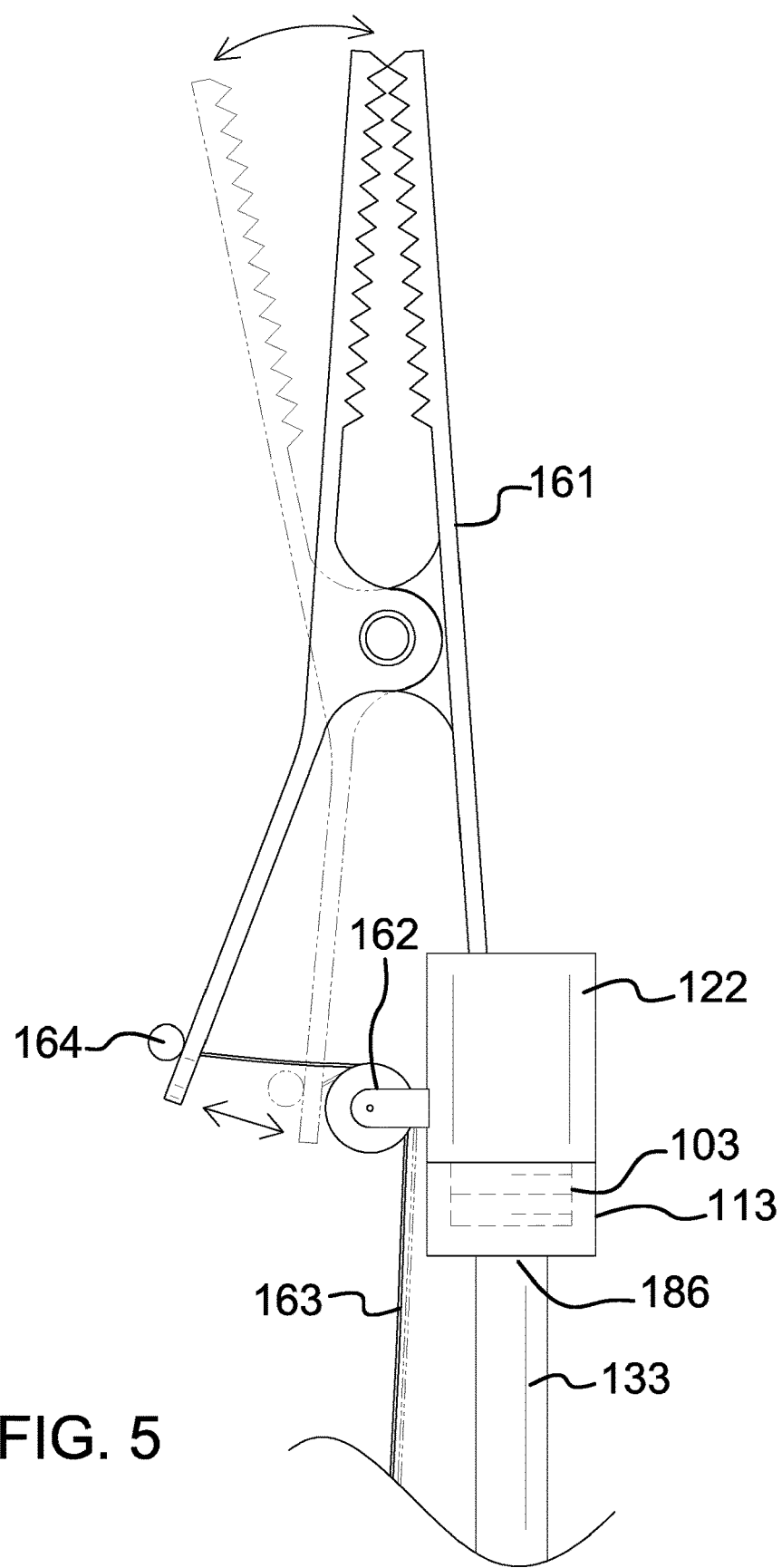
FIG. 5 is a detail view of an embodiment of the disclosure.
Figure 6:
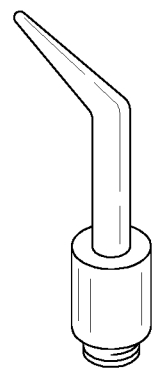
FIG. 6 is an accessory of an embodiment of the disclosure.
Figure 7:
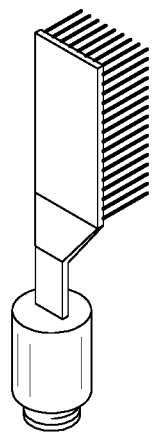
FIG. 7 is an accessory of an embodiment of the disclosure.
Figure 8:
FIG. 8 is an accessory of an embodiment of the disclosure.

Detailed reference will now be made to one or more potential embodiments of the disclosure, which are illustrated in FIGS. 1 through 8.

The telescoping back tool kit 100 (hereinafter invention) is a multipurpose tool. The invention 100 comprises a base apparatus 101, a plurality of heads 102, and a threaded connection 103. The threaded connection 103 removably attaches a head selected from the plurality of heads 102 to the base apparatus 101. The head forms the working element 121 of the invention 100. The purpose of the invention 100 is changed by interchanging two heads selected from the plurality of heads 102 to change the working element 121 of the invention 100. The base apparatus 101 is a mechanical structure used to adjust the span of the distance between a user of the invention 100 and the working element 121 of the head selected from the plurality of heads 102.

The threaded connection 103 removably attaches any head selected from the plurality of heads 102 to the base apparatus 101 such that any first head selected from the plurality of heads 102 interchanges with any second head selected from the plurality of heads 102. The threaded connection 103 is formed such that any head selected from the plurality of heads 102 screws into the base apparatus 101. The threaded connection 103 comprises an exterior screw thread 123 and an interior screw thread 124. The threaded connection 103 is defined in greater detail elsewhere in this disclosure.

The base apparatus 101 forms the primary structure of the invention 100. The base apparatus 101 allows for the manipulation of the head selected from the plurality of heads 102 when the invention 100 is in use. The span of the length of the base apparatus 101 adjusts such that the reach of the invention 100 is adjustable. The base apparatus 101 comprises a telescopic structure 111, a handle 112, and a nut 113.

The telescopic structure 111 is an extension apparatus that comprises a first arm 131, a second arm 132, and a first detent 134. The first detent 134 attaches the first arm 131 to the second arm 132. The first arm 131 is a hollow prism that is further defined with an inner dimension. The second arm 132 is further defined with an outer dimension. The second arm 132 is geometrically similar to the first arm 131. The span of the outer dimension of the second arm 132 is lesser than the span of the inner dimension of the first arm 131 such that the second arm 132 inserts into the first arm 131 in a telescopic fashion.

This telescopic arrangement of the telescopic structure 111 allows the length of the telescopic structure 111 to adjust by adjusting the relative position of the second arm 132 within the first arm 131. The position of the second arm 132 relative to the first arm 131 is held in position using the first detent 134. The first detent 134 is a mechanical device that locks and secures the second arm 132 to the first arm 131. In the first potential embodiment of the disclosure, the first detent 134 is formed from frictional forces between the first arm 131 and the second arm 132.

The telescopic structure 111 further comprises a third arm 133 and a second detent 135. The second detent 135 attaches the third arm 133 to the second arm 132. The second arm 132 is a hollow prism that is further defined with an inner dimension. The third arm 133 is further defined with an outer dimension. The third arm 133 is geometrically similar to the second arm 132. The span of the outer dimension of the third arm 133 is lesser than the span of the inner dimension of the second arm 132 such that the third arm 133 inserts into the second arm 132 in a telescopic fashion.

This telescopic arrangement of the telescopic structure 111 allows the length of the telescopic structure 111 to adjust by adjusting the relative position of the third arm 133 within the second arm 132. The position of the third arm 133 relative to the second arm 132 is held in position using the second detent 135. The second detent 135 is a mechanical device that locks and secures the third arm 133 to the second arm 132. In the first potential embodiment of the disclosure, the second detent 135 is formed from frictional forces between the second arm 132 and the third arm 133.

The first arm 131 is further defined with a first end 181 and a second end 182. The second arm 132 is further defined with a third end 183 and a fourth end 184. The third arm 133 is further defined with a fifth end 185 and a sixth end 186.

The telescopic structure 111 attaches to the handle 112 in the manner of a cantilever. The handle 112 is the structure of the base apparatus 101 that is physically grasped during the use of the invention 100. The handle 112 comprises a grip 141 and a trigger 142. The grip 141 is further defined with a seventh end 187 and an eighth end 188.

The grip 141 is a structure intended for grasping. The grip 141 is a roughly prism-shaped structure intended to be grasped by a hand. The trigger 142 is a mechanical device. The trigger 142 attaches to the grip 141 of the handle 112. The trigger 142 allows for the manipulation of the alligator clip 161 when the head selected from the plurality of heads 102 is the grasping tool 155. The trigger 142 comprises a lever 171, a pivot 172, and a hook 173.

The lever 171 is a shaft that rotates around a fulcrum. The lever 171 rotates around the fulcrum such that tension is applied to the cord 163 of the grasping tool 155. The pivot 172 is a shaft that attaches the lever 171 to the grip 141 such that the pivot 172 forms a fulcrum around which the lever 171 rotates. The pivot 172 attaches the lever 171 to the grip 141 in the manner of a cantilever. The hook 173 is a curvature formed in the free end of the lever 171. The ring 165 of the grasping tool 155 attaches to the hook 173.

The nut 113 is a disk-shaped structure that attaches to the free end of the cantilever structure of the telescopic structure 111. The nut 113 is a commercially available hardware item. Any head selected from the plurality of heads 102 screws into the nut 113. The nut 113 is further defined with the interior screw thread 124. The interior screw thread 124 is an interior screw thread 124 formed between the ends of the disk-shaped structure of the nut 113 such that the center axis of the interior screw thread 124 aligns with the center axis of the nut 113.

Each of the plurality of heads 102 forms the working structure of the invention 100. Each of the plurality of heads 102 comprises a working element 121, a connecting cylinder 122, and the exterior screw thread 123.

The working element 121 is the element of each head selected from the plurality of heads 102 that physically performs the function of the selected configured tool formed by the invention 100. The difference between any first head selected from the plurality of heads 102 and any second head selected from the plurality of heads 102 is the working element 121 associated with the selected head.

The working element 121 is selected from the group consisting of a scratching harrow 151, a sponge 152, a horn 153, a magnet 154, and a grasping tool 155.

The scratching harrow 151 is an abrasive structure. The scratching harrow 151 is suitable for use in scratching a location that is otherwise out of reach. The sponge 152 is a sponge 152 suitable for use in cleansing. The horn 153 is a roughly bladed structure such as a shoe horn 153. The magnet 154 is a magnetic structure used for attracting objects formed from magnetic metals. The grasping tool 155 is a clip that is used to grasp objects.

The design of the grasping tool 155 allows for the manipulation of the grasping tool 155 from the handle 112 of the base apparatus 101. The grasping tool 155 comprises an alligator clip 161, a pulley 162, a cord 163, a stopper knot 164, and a ring 165. The cord 163 is further defined with a standing end 166 and a working end 167. The standing end 166 is defined in greater detail elsewhere in this disclosure. The working end 167 is defined in greater detail elsewhere in this disclosure.

The alligator clip 161 is a commercially available item. The alligator clip 161 is a spring-loaded clip. The alligator clip 161 is a toothed clip. The spring contained in the alligator clip 161 is in a relaxed shape while the clip is in a closed position. If the invention 100 is used to don or remove garments from an end user, it may be necessary to use two sets of the invention 100 simultaneously. In this scenario, the alligator clips 161 would attach to opposing sides of the garment so that the end user can pull up the garment in order to don said garment on the end user.

The pulley 162 is a commercially available item. The pulley 162 attaches to the lateral face of the connecting cylinder 122. The pulley 162 changes the direction of the cord 163. The cord 163 is a commercially available item.

The cord 163 attaches to the alligator clip 161 such that when a tension is applied to the cord 163, the spring of the alligator clip 161 deforms such that the alligator clip 161 opens. The pulley 162 mounts on the connecting cylinder 122 such that the pulley 162 adjusts the direction for the cord 163 to a direction parallel to the telescopic structure 111. The cord 163 threads through an aperture formed in the alligator clip 161. The cord 163 attaches to the alligator clip 161 through the use of a stopper knot 164 formed in the working end 167 of the cord 163. The cord 163 attaches to the trigger 142 of the handle 112 such that the rotation of the trigger 142 applies a tension to the cord 163, which opens the alligator clip 161.

The ring 165 attaches the cord 163 to the lever 171 of the trigger 142. The ring 165 is a loop-shaped device. The ring 165 attaches to the standing end 166 of the cord 163.

The connecting cylinder 122 is a prism-shaped structure. The connecting cylinder 122 is an extension structure that separates the working element 121 from the nut 113 of the base apparatus 101. The working element 121 attaches to a base end of the connecting cylinder 122.

The exterior screw thread 123 is an exterior screw thread 123 attached to the connecting cylinder 122. The exterior screw thread 123 is formed on the base end of the connecting cylinder 122 that is distal from the working element 121. The exterior screw thread 123 is sized such that the exterior screw thread 123 screws into the interior screw thread 124. The exterior screw thread 123 screws into the interior screw thread 124 such that the nut 113 and the connecting cylinder 122 form a composite prism. The exterior screw thread 123 screws into the interior screw thread 124 to form the threaded connection 103.

The threaded connection 103, the exterior screw thread 123, the interior screw thread 124, and the nut 113 are defined in greater detail elsewhere in this disclosure.

The following two paragraphs describe the final assembly of the invention 100.

The third end 183 of the second arm 132 inserts into the second end 182 of the first arm 131. The fifth end 185 of the third arm 133 inserts into the fourth end 184 of the second arm 132. The first end 181 of the first arm 131 attaches to the eighth end 188 of the handle 112 to form a composite prism. The joint formed by the first end 181 and the eighth end 188 forms the fixed end of the cantilever structure of the telescopic structure 111. The nut 113 attaches to the sixth end 186 of the third end 183 to form a composite prism. The joint formed by the nut 113 and the third end 183 forms the free end of the cantilever structure of the telescopic structure 111.

The threaded connection 103 attaches any head selected from the plurality of heads 102 to the nut 113 of the base apparatus 101. Specifically, the exterior screw thread 123 of the selected head screws into the interior screw thread 124 of the nut 113 of the base apparatus 101.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clip: As used in this disclosure, a clip is a fastener that attaches to an object by gripping or clasping the object. A clip is typically spring loaded.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Disk: As used in this disclosure, a disk is a prism-shaped object that is flat in appearance. In this disclosure, the surface area of the ends of the prism-shaped object that forms the disk is greater than the lateral face of the prism-shaped object that forms the disk. In this disclosure, the ends of the prism-shaped structure that forms the disk are referred to as the faces of the disk.

Extension Apparatus: As used in this disclosure, an extension apparatus is a mechanical structure that is used to extend the span of the distance between any two objects or the reach of a first object towards a second object.

Extension Structure: As used in this disclosure, an extension structure is an inert physical structure that is used to extend the span of the distance between any two objects.

Exterior Screw Thread: An exterior screw thread is a ridge wrapped around the outer surface of a tube in the form of a helical structure that is used to convert rotational movement into linear movement.

Fulcrum: As used in this disclosure, a fulcrum is a support around which a lever rotates.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hardware: As used in this disclosure, refers to one or more incidental objects: 1) that are readily and commercially available; and, 2) that are associated with the installation, operation or maintenance of a primary object.

Hinge: As used in this disclosure, a hinge is a device that permits the turning, rotating, or pivoting of a first object relative to a second object.

Hook: As used in this disclosure, a hook is an object that is curved or bent at an angle such that items can be hung on or caught by the object.

Incidental: As used in this disclosure, incidental refers to a second object that is associated with a first object but that: 1) does not significantly affect the characteristics of the first object; and, 2) the function of which can be readily replaced by or substituted with a third object.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior Screw Thread: An interior screw thread is a groove that is formed around the inner surface of a tube in the form of a helical structure that is used to convert rotational movement into linear movement.

Knot: As used in this disclosure, a knot is an interlacement of cord, ribbon, rope, or similar materials used to: 1) secure the cord, ribbon, rope, or other similar material to an object which may include, but is not limited to, a second cord, ribbon, rope, or other similar material; or, 2) prevent the cord, ribbon, rope, or other similar material from being pulled through a hole or out of a retaining device. In this disclosure, the second type of knot is referred to as a stopper knot.

Lever: As used in this disclosure, a lever is a simple machine that comprises a shaft that rotates around a fulcrum or pivot point.

Magnet: As used in this disclosure, a magnet is an ore, alloy, or other material that has its component atoms arranged such that the material exhibits properties of magnetism such as: 1) attracting other iron-containing objects; 2) attracting other magnets; or, 3) or aligning itself in an external magnetic field.

Nut: As used in this disclosure, a nut is a first object that is formed with a cylindrical negative space that further comprises an interior screw thread such that a second object with a matching exterior screw thread can screw into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pivot: As used in this disclosure, a pivot is a rod or shaft around which an object rotates or swings.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pulley: As used in this disclosure a pulley is a wheel with a grooved rim around which a cord (or other form of rope, line, or cable) passes. The pulley is used to change the direction of a force applied to the cord. A pulley is considered a simple machine.

Reach: As used in this disclosure, reach refers to a span of distance within which the first object can be grasped, manipulated, or operated by a second object or a person.

Screw: As used in this disclosure, to screw is a verb meaning: 1) to fasten or unfasten (unscrew) a threaded connection; or 2) to attach a helical structure to a solid structure.

Simple Machine: As used in this disclosure, a simple machine refers to a device that consists of a mechanism selected from the group consisting of: 1) an inclined plane, 2) a lever; 3) a pivot, 4) a pulley, 5) a screw, 6) a spring, 7) a wedge, and 8) a wheel (including axles). A compound machine is a device that consists of a plurality of mechanisms selected from the group consisting of the simple machine.

Sponge: As used in this disclosure, a sponge is a material, generally with a fibrous structure, that is capable of absorbing and retaining liquids through capillary action.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Standing End: As used in this disclosure, the standing end refers to the end of a rope or line that is not involved with a knot. The standing end is usually the end opposite the working end of a rope or line.

Telescopic: As used in this disclosure, telescopic is an adjective that describes an object made of sections that fit or slide into each other such that the object can be made longer or shorter by adjusting the relative positions of the sections.

Thread: As used in this disclosure, to thread is a verb that refers to inserting a cord or a webbing through one or more holes.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Trigger: As used in this disclosure, a trigger is a lever that operates in conjunction with a spring or similar device such that: 1) the lever is used to activate a mechanism; and 2) the spring or similar device returns the lever to its original position after the mechanism has been activated.

Tool: As used in this disclosure, a tool is a device, an apparatus, or an instrument that is used to carry out an activity, operation, or procedure.

Working End: As used in this disclosure, the working end refers to the end of a rope or line that forms a knot. The working end is usually the end opposite the standing end of a rope or line.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A hand-operated mechanical implement comprising a base apparatus, a plurality of heads, and a threaded connection;
   wherein the threaded connection removably attaches a head selected from the plurality of heads to the base apparatus;
   wherein the hand-operated mechanical implement is a tool;
   wherein the function of the hand-operated mechanical implement is changed by interchanging any heads selected from the plurality of heads;
   wherein the span of the length of the base apparatus adjusts such that the reach of the hand-operated mechanical implement is adjustable;
   wherein the threaded connection removably attaches any head selected from the plurality of heads to the base apparatus such that any first head selected from the plurality of heads interchanges with any second head selected from the plurality of heads;
   wherein the threaded connection is formed such that any head selected from the plurality of heads screws into the base apparatus;
   wherein the base apparatus comprises a telescopic structure, a handle, and a nut;
   wherein the handle attaches to the telescopic structure;
   wherein the nut attaches to the telescopic structure;
   wherein the telescopic structure is an extension apparatus that comprises a first arm, a second arm, and a first detent;
   wherein the position of the second arm relative to the first arm is held in position using the first detent;
   wherein the first detent is a mechanical device that locks and secures the second arm to the first arm.

2. The hand-operated mechanical implement according to claim 1
   wherein the first arm is a hollow prism that is further defined with an inner dimension;
   wherein the second arm is a hollow prism that is further defined with an outer dimension;
   wherein the second arm is geometrically similar to the first arm;
   wherein the span of the outer dimension of the second arm is lesser than the span of the inner dimension of the first arm such that the second arm inserts into the first arm in a telescopic fashion.

3. The hand-operated mechanical implement according to claim 2
   wherein the telescopic structure further comprises a third arm and a second detent;
   wherein the second detent is a mechanical device that locks and secures the third arm to the second arm;
   wherein the first arm is further defined with a first end and a second end;
   wherein the second arm is further defined with a third end and a fourth end.

4. The hand-operated mechanical implement according to claim 3
   wherein the third arm is geometrically similar to the second arm;
   wherein the second arm is further defined with an inner dimension;
   wherein the third arm is further defined with an outer dimension;
   wherein the span of the outer dimension of the third arm is lesser than the span of the inner dimension of the second arm such that the third arm inserts into the second arm in a telescopic fashion;
   wherein the third arm is further defined with a fifth end and a sixth end.

5. The hand-operated mechanical implement according to claim 4 wherein the telescopic structure attaches to the handle in the manner of a cantilever.

6. The hand-operated mechanical implement according to claim 5
   wherein the handle comprises a grip and a trigger;
   wherein the trigger attaches to the grip;
   wherein the grip is further defined with a seventh end and an eighth end.

7. The hand-operated mechanical implement according to claim 6
   wherein the trigger is a mechanical device;
   wherein the trigger comprises a lever, a pivot, and a hook;
   wherein the lever is a shaft that rotates around a fulcrum;
   wherein the pivot is a shaft that attaches the lever to the grip such that the pivot forms a fulcrum around which the lever rotates;
   wherein the pivot attaches the lever to the grip in the manner of a cantilever;
   wherein the hook is a curvature formed in the free end of the lever.

8. The hand-operated mechanical implement according to claim 7
   wherein the nut is a disk-shaped structure;
   wherein the nut attaches to the free end of the cantilever structure of the telescopic structure;
   wherein any head selected from the plurality of heads screws into the nut;
   wherein the nut is further defined with an interior screw thread;
   wherein the interior screw thread is an interior screw thread formed between the ends of the disk-shaped structure of the nut such that the center axis of the interior screw thread aligns with the center axis of the nut.

9. The hand-operated mechanical implement according to claim 8
   wherein each of the plurality of heads comprises a working element, a connecting cylinder, and an exterior screw thread;
   wherein the exterior screw thread attaches to the connecting cylinder;
   wherein the working element attaches to the connecting cylinder.

10. The hand-operated mechanical implement according to claim 9 wherein the difference between any first head selected from the plurality of heads and any second head selected from the plurality of heads is the working element associated with the selected head.

11. The hand-operated mechanical implement according to claim 10
    wherein the connecting cylinder is a prism-shaped structure;
    wherein the connecting cylinder is an extension structure that separates the working element from the nut of the base apparatus;
    wherein the working element attaches to a first base end of the connecting cylinder;
    wherein the exterior screw thread is an exterior screw thread attached to the connecting cylinder;
    wherein the exterior screw thread is formed on a second base end of the connecting cylinder that is distal from the working element.

12. The hand-operated mechanical implement according to claim 11
    wherein the exterior screw thread is sized such that the exterior screw thread screws into the interior screw thread;
    wherein the exterior screw thread screws into the interior screw thread such that the nut and the connecting cylinder form a composite prism;
    wherein the exterior screw thread screws into the interior screw thread to form the threaded connection.

13. The hand-operated mechanical implement according to claim 12
    wherein the working element is selected from the group consisting of a scratching harrow, a sponge, a horn, a magnet, and a grasping tool;
    wherein the scratching harrow is an abrasive structure;
    wherein the sponge is a sponge suitable for use in cleansing;
    wherein the horn is a bladed structure;
    wherein the magnet is a magnetic structure suitable for attracting objects formed from magnetic metals;
    wherein the grasping tool clasps objects.

14. The hand-operated mechanical implement according to claim 13
    wherein the grasping tool comprises a clip, a pulley, a cord, a stopper knot, and a ring;
    wherein the stopper knot attaches the cord to the clip;
    wherein the cord threads through the pulley;
    wherein the ring attaches the cord to the trigger;
    wherein the cord is further defined with a standing end and a working end.

15. The hand-operated mechanical implement according to claim 14
    wherein the clip is a spring-loaded clip;
    wherein the spring contained in the clip is in a relaxed shape while the clip is in a closed position;
    wherein the pulley attaches to the lateral face of the connecting cylinder;
    wherein the pulley changes the direction of the cord;
    wherein the cord attaches to the clip such that when a tension is applied to the cord, the spring of the clip deforms such that the clip opens;
    wherein the pulley mounts on the connecting cylinder such that the pulley adjusts the direction for the cord to a direction parallel to the telescopic structure;
    wherein the cord threads through an aperture formed in the clip;
    wherein the cord attaches to the clip through the use of a stopper knot formed in the working end of the cord.

16. The hand-operated mechanical implement according to claim 15
    wherein the ring attaches the cord to the hook of the lever of the trigger such that the rotation of the trigger applies a tension to the cord;
    wherein the ring is a loop-shaped device;
    wherein the ring attaches to the standing end of the cord.

17. The hand-operated mechanical implement according to claim 16
    wherein the third end of the second arm inserts into the second end of the first arm;
    wherein the fifth end of the third arm inserts into the fourth end of the second arm;
    wherein the first end of the first arm attaches to the eighth end of the handle to form a composite prism;
    wherein the joint formed by the first end and the eighth end forms the fixed end of the cantilever structure of the telescopic structure;
    wherein the nut attaches to the sixth end of the third end to form a composite prism;
    wherein the joint formed by the nut and the third end forms the free end of the cantilever structure of the telescopic structure;
    wherein the threaded connection attaches any head selected from the plurality of heads to the nut of the base apparatus;
    wherein the exterior screw thread of the selected head screws into the interior screw thread of the nut of the base apparatus.

* * * * *